Patented Sept. 16, 1941

2,256,196

UNITED STATES PATENT OFFICE 2,256,196

PURIFICATION OF DIPHENYLAMINE

William F. Filbert, Woodbury, N. J., assignor to E. I. du Pont de Nemours & Company, Wilmington, Del., a corporation of Delaware No Drawing. Application February 2, 1940, Serial No. 316,929

5 Claims. (Cl. 260—576)

This invention pertains to diphenylamine, particularly with respect to the production of a diphenylamine of enhanced purity.

The production of diphenylamine usually involves the condensation of aniline by heating at high pressures in the presence of a catalyst. After a suitable reaction period, the diphenylamine is separated by fractional distillation at reduced pressures, and the molten distillate is grained by being permitted to cool slowly with agitation or stirring thereof. The freshly grained diphenylamine is nearly white, having a yellowish cast. However, as it ages, the material tends to become tan and then dark brown, this discoloration being accelerated with increased exposure to light and air.

There is a tendency to limit the use of this material because the belief prevails that the otherwise advantageous incorporation in various products of diphenylamine having the property of darkening as it ages is unwise because it may cause undesirable darkening of said products.

Consequently, efforts have been made to eliminate the discoloration of diphenylamine. For instance, attempts have been made to eliminate discoloration by recrystallization methods. However, all such methods disclosed heretofore have been inadequate in some respect, being both time consuming and expensive.

The object of the present invention is a novel method for inhibiting the discoloration of diphenylamine. Another object is a method of improving the purity of diphenylamine by a process involving the treatment of the surface of granular diphenylamine. Other objects will become apparent as the invention is described hereinafter.

I have found that the foregoing objects are accomplished by treating granular diphenylamine with a material which is a solvent for the impurities causing discoloration, but which is substantially a non-solvent for the diphenylamine itself. The process involves a surface treatment of the diphenylamine and does not contemplate complete solution of the diphenylamine in the manner characterizing recrystallization processes. Quite surprisingly, this surface treatment is very effective with respect to inhibition of the discoloration phenomenon.

This granular diphenylamine is treated with a selective solvent such as a solution of water and a monohydric alcohol of low molecular weight, e. g. methanol, wherein methanol represents perhaps 70 percent of the entire solution, said solvent being applied in a manner which insures its contact with the surfaces of the grains. The time of application of the solvent is that required to effect substantially complete washing of the surface of the grains. This treatment produces a diphenylamine of white color which has a higher freezing point and is much more stable in storage than the standard material.

Although diphenylamine, which has already become highly discolored, may be processed in accordance with my invention, I prefer to treat diphenylamine which has been freshly distilled and grained, that is to say, which has been grained a relatively short time prior to my treatment, because the purification treatment is more effective then than if the diphenylamine already has become discolored.

The invention is illustrated by the following example, which is cited as a specific embodiment thereof.

*Example*

Freshly-grained diphenylamine of freezing point 52.30° C. was screened through a standard 20-mesh sieve, in order to eliminate any aggregates which might be present. 250 grams of the screened material was then placed on a Buchner funnel and washed at room temperature with three successive portions (150 grams, 100 grams, and 100 grams) of a water-methanol solution containing 70% of methanol, the liquid being drawn off with suction after each treatment. The first wash was bright yellow in color, whereas the last was practically colorless, thereby indicating that a negligible quantity of the impurity was removed by the last application of water-methanol mixture. The filter cake was then washed with cold water in order to remove residual methanol, following which the cake was dried at room temperature. When dry, the purified diphenylamine was white in color and weighed 237 grams, which represents 94.8% recovery. The freezing point of the purified product was 52.83° C.

It will be understood that any solvent which is selective with respect to the impurities causing discoloration of diphenylamine is operative. However, I have found that the monohydric alcohols of low molecular weight are particularly effective, when used in conjunction with water. Although the ratio of water to alcohol may be varied rather broadly, I prefer to employ a mixture containing at least 50 percent of the alcohol. Thus, such mixtures containing methanol, ethanol, isopropanol and the like have proved very satisfactory. Another solvent which does not come within the class of monohydric alcohols of low molecular weight, but which nevertheless has proved efficacious, is petroleum ether.

The effects of treating diphenylamine in accordance with my invention are particularly striking. Not only does a diphenylamine white in color result from a treatment that is essentially a surface washing of the grains, but in addition the treated product exhibits much less tendency to set or cake. This latter property is a distinct advantage, in view of the fact that ordinary diphenylamine, when stored for even short periods of time, tends to cake and form hard lumps which can be broken down only with great difficulty. Since many uses of diphenylamine require that it be in finely-divided condition, a product which cakes less readily is a definite asset. Moreover, the color-stability of the resultant diphenylamine is very much improved. Storage tests show that this material, when stored in closed containers, remains unchanged in color even after a period of more than one and one-half years. Likewise, if subjected to light, the material exhibits such a slight tendency toward discoloration that it can be classified as a color-stable material.

It will be obvious that the foregoing description permits of variations without departing from the spirit or scope of the invention. Consequently, the method contemplates a continuous treatment of the diphenylamine by recirculation of recovered, impurity-free solvent, and also by countercurrent operation with used solvent. Nor is it necessary to effect the surface treatment in a zone to which suction can be applied, since equipment not requiring the use of suction is known, which will permit facile removal of the selective solvent. Likewise, in certain cases, it may be found expedient to employ agitation in order to be certain that the surface of each grain is brought into contact with impurity-removing medium. I intend, therefore, to be limited only in accordance with the following claims.

I claim:

1. A method for purifying diphenylamine which comprises treating freshly-grained diphenylamine with an excess of a solution composed of at least 50 percent by weight of a saturated monohydric alcohol of a molecular weight less than that of butyl alcohol and water, said solution being brought into intimate contact with the surface of the grains for a time sufficient to dissolve the adsorbed impurities thereon, and then separating the grains from said solution.

2. The method of claim 1, wherein the monohydric alcohol of low molecular weight is methanol.

3. The method of claim 1, wherein the monohydric alcohol of low molecular weight is ethanol.

4. The method of claim 1, wherein the monohydric alcohol of low molecular weight is isopropanol.

5. A method of purifying diphenylamine which comprises treating freshly granulated diphenylamine with an organic solvent for the substances causing discoloration of diphenylamine, but which possesses a limited solubility for diphenylamine, said solvent being selected from the group consisting of the alcohols and hydrocarbons, said solvent being brought into intimate contact with the surface of the grains of diphenylamine for a time sufficient to dissolve the adsorbed impurities thereon, and separating the grains from the solvent.

WILLIAM F. FILBERT.